United States Patent

[11] 3,618,017

[72] Inventors Noboru Murayama
Saganihara-shi;
Kinichi Yoshikawa, Kawasak-shi; Kanji Kanai, Tokyo, all of Japan

[21] Appl. No. 843,977
[22] Filed June 23, 1969
[45] Patented Nov. 2, 1971
[73] Assignee Kabushiki Kaisha Ricoh
Tokyo, Japan
[32] Priority July 25, 1968
[33] Japan
[31] 43/52114

[54] DATA PROCESSING SYSTEM
2 Claims, 2 Drawing Figs.

[52] U.S. Cl. .......... 340/146.1, 179/15 AE
[51] Int. Cl. .......... G08c 25/02
[50] Field of Search .......... 340/146.1; 235/153; 179/15 AE, 15 BS

[56] References Cited

UNITED STATES PATENTS

| | | | |
|---|---|---|---|
| 3,392,371 | 7/1968 | Sourgens | 340/146.1 |
| 3,452,330 | 6/1969 | Avery | 340/146.1 X |
| 3,426,323 | 2/1969 | Shimabukuro | 340/146.1 |
| 3,456,239 | 7/1969 | Glasson | 349/146.1 |

*Primary Examiner*—Eugene G. Botz
*Assistant Examiner*—Charles E. Atkinson
*Attorney*—Burgess, Ryan & Hicks

ABSTRACT: A data processing system wherein a receiver counts and stores the number of digits of one block of data received from the first digit thereof until an erroneous digit is detected; when said erroneous digit is detected, the output is prevented from being applied to an output medium while the retransmission of said one block of data from the first digit thereof is made; and when the number of digits retransmitted coincides with said first-mentioned number of digits, the outputs of the subsequent digits are applied to said output medium.

INVENTORS
NOBORU MURAYAMA
KINICHI YOSHIKAWA
KANJI KANAI
BY
Burgess, Ryan & Hicks
ATTORNEYS

DATA PROCESSING SYSTEM

The present invention relates to a data processing system and more particularly to an improved transmission system for transmitting and receiving the digits in the form of a block consisting of a plurality of digits.

In the conventional data transmission system, a register having a capacity of storing more than one block of data is generally arranged before an output device in a receiver for processing and received digits and thereby passing them to an output media such as punch cards or printed tape. This is done in order that correct "clean" codes may be reproduced on the output media. However, the provision of such register in a terminal equipment is very expensive, and the content of the register is transferred to the output medium only after the last digit of one block of data has been received. Furthermore, in order to receive the next block of data during the transfer of the previously received digits to the output medium, two registers must be provided.

In view of the above, the primary object of the present invention is to provide a novel data processing system simple in construction without the use of the registers, inexpensive to manufacture, and reliable in its operation of applying the only error-free digits to an output medium.

The present invention provides a novel data processing system for transmitting and receiving blocks of data consisting of a plurality of digits in which a receiver counts and stores a number of digits of one block of data received from the first digits thereof until an erroneous digit is detected; when said erroneous digit is detected, the application of the output of the digit to an output medium is stopped while the retransmission of said block is started from the first digit thereof; and when a number of digits retransmitted coincides with said first-mentioned number of digits counted until said erroneous digit is detected, the outputs of the digits are again applied to the output medium. Thus, according to the present invention, the digit registers capable of storing more than one block of data may be eliminated and the erroneous digit will never be applied to the output medium.

The above and other objects, features and advantages of the present invention will become more clear from the following description of one illustrative embodiment thereof with reference to the accompanying drawing.

Figure 1:
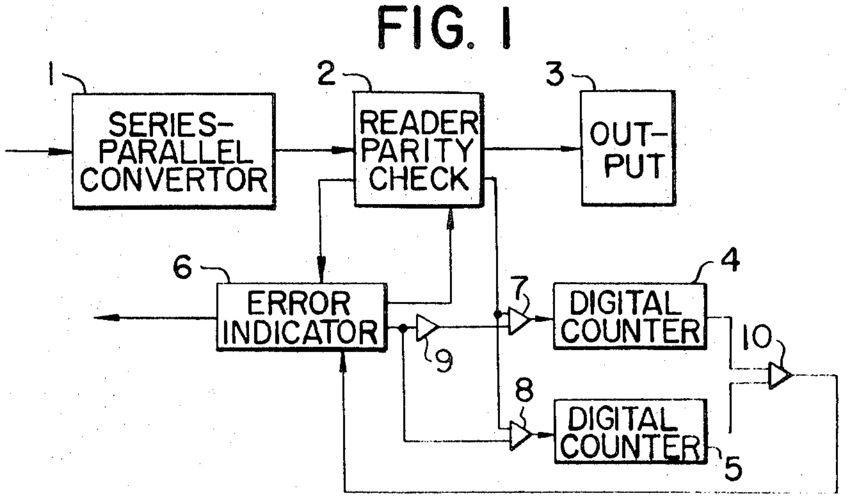

FIG. 1 is a block diagram of one embodiment of the present invention; and

Figure 2:
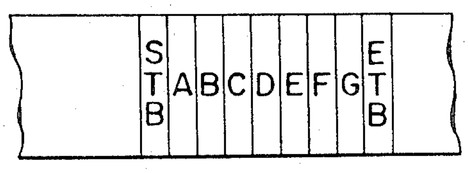

FIG. 2 illustrates one example of a block of data used in the present invention. FIG. 1 is a block diagram of a receiver of a data processing system of the present invention; and FIG. 2 illustrates an example of a block of data consisting of STB digit, seven digits A, B, C, D, E, F and G and ETB digit. Each digit consisting of 6 or 8 bits which are transmitted in series.

A series of digits transmitted, are converted into parallel digits in a series-parallel converter 1. Reference numeral 2 designates a circuit for reading the digits and making parity checks. When errors are detected, the output of the reader 2 of the erroneous digit (and those following) will not be applied to an output device 3 (for example punched-card system), while an error signal is applied to an error-indicating circuit 6. The number of the digits received is applied to a digital counter 4 or 5 through an AND-gate 7 or 8. Reference numeral 9 designates a NOT gate for applying to the AND-gate 7 a not signal of the signal from the circuit 2 applied to the error-indicating circuit 6. Reference numeral 10 designates an AND gate which transmits a reset signal to the error-indicating circuit 6 upon coincidence of the numbers counted by the digital counters 4 and 5.

The block of data shown in Fig. 2 is received in the order of the digits STB, A, B, C, D, E, F AND G and ETB and when no error is detected in the circuit 2, the outputs are applied to the output device 3 which for example punches a card.

In this case a no-error signal, for example 0 is applied to the error-indicating circuit 6 while the signal 1 is applied to the AND gate 7 through the NOT-gate 9 so that the gate 7 is opened and the digital counter 4 counts a number of correct digits applied to the circuit 2. If the code D is detected to have an error in the circuit 2, an error signal for example 1 is applied to the error-indicating circuit 6, thereby indicating the error. Therefore, the error-indicating circuit 6 demands for the retransmission of data and applies the signal 1 to the AND-gate 8 so as to open it, and also applies a signal to the circuit 2 to cause it to stop applying the outputs of the digits following the error code to the output device 3.

The transmitter retransmits the block of data from the first digit STB so that the receiver receives the block of data from the first digit STB, but the receiver counts the number of digits received without error in the digital counter 5. Therefore, when the number of digits of the retransmitted block of data, coincides with the number of digits already received up to the erroneous digit D, the content in the counter 5 coincides with that in the counter 4 so that the outputs from the digital counters 4 and 5 are applied to the AND-gate 10 and then to the error-indicating circuit 6 as reset pulse. Thus, the error-indicating circuit 6 is reset and the circuit 2 applies the outputs of the codes following the code D to the output device 3.

From the foregoing, it will be seen that according to the present invention a register having a capacity of storing one block of data and being arranged before the output device 3 may be eliminated and the erroneous digit will not be applied to the output device while only correct digits are applied to the output device. Thus, the data transmission or processing device may be fabricated at less cost.

We claim:

1. A data processing system for receiving and transmitting clean data, comprising an input for receiving data blocks of digits which may include erroneous digits, and an output terminal at which clean data is applied to a recorder means, comprising means for detecting a received erroneous digit; means coupled to said detector means and responsive to the detected erroneous digit for demanding retransmission of the same data block; first counting means for counting the amount of data sent to the output and thereby recording the position of the erroneous digit in the block; first counting means for counting the amount of data sent to the output and thereby recording the position of the erroneous digit in the block; second counting means for recording the position of each data digit during retransmission; and gating means connected to said first and second counting means for supplying the retransmitted clean digit to said output media after the contents of said counting means coincides with each other.

2. A data processing system in which blocks of digits are passed, digit by digit, from an input to an output through a reader parity check which stops transmission of said digits when an erroneous one is detected, and which also provides an error signal when said erroneous digit is detected, comprising first and second gates having their inputs connected to the reader;

first and second digital counters connected to the outputs of the first and second gates respectively, for selectively counting the number of digits of the reader;

a comparator connected to the counters for comparing the numbers therein and providing a compared signal that they are in a predetermined relation;

a binary error indicator having a pair of inputs and at least one output, said first input being connected to the reader for receiving said error signal and adapted to render the binary in a first condition in response to said error signal, said second input being connected to the comparator for receiving the compared signal and adapted to render the binary in a second condition in response to said signal, and said output being connected in conjugate relationship to the first and second gates whereby said first gate is enabled when said binary is in its second condition, and said second gate is enabled when said binary is in its first condition, said output also applying a retransmit block request in response to an error signal for initiating retransmittal of the data block; and a circuit connection to the reader to restart transmission of said digits in response to said compare signal; whereby said first gate is enabled by the binary and said first counter counts the number of digits in a block up to the detection of an erroneous digit, after which said binary is rendered in its first condition and the first gate is disabled and the second gate is enabled, and the second counter counts the number of digits of the retransmitted block until it is coincident with the number of correct digits of the original block, then the compare signal is provided, and the error indicator binary switches states and the first counter continues counting until the detection of another erroneous digit.

* * * * *